United States Patent [19]

Morisawa et al.

[11] Patent Number: 4,967,219
[45] Date of Patent: Oct. 30, 1990

[54] CAMERA WITH ZOOM LENS

[75] Inventors: Tahei Morisawa; Makoto Mogamiya, both of Tokyo, Japan

[73] Assignee: Asahi Kogaku Kogyo Kabushiki Kaisha, Tokyo, Japan

[21] Appl. No.: 416,986

[22] Filed: Oct. 4, 1989

[30] Foreign Application Priority Data

Oct. 4, 1988 [JP] Japan ............................ 63-130184[U]

[51] Int. Cl.[5] .............................................. G03B 3/00
[52] U.S. Cl. .................................. 354/199; 354/219; 354/221
[58] Field of Search ................ 354/195.1, 195.12, 199, 354/201, 219, 224, 225, 221-223

[56] References Cited

U.S. PATENT DOCUMENTS

| 4,000,501 | 12/1976 | Sakaguchi et al. | 354/199 |
| 4,032,938 | 6/1977 | Karikawa et al. | 354/225 |
| 4,131,354 | 12/1978 | Hagiwara | 354/224 |

Primary Examiner—L. T. Hix
Assistant Examiner—David M. Gray
Attorney, Agent, or Firm—Sandler, Greenblum & Bernstein

[57] ABSTRACT

A zoom lens camera in which a zoom-photographing optical system is disposed separately from a finder optical unit, the zoom-photographing optical system being zoomed by rotating a cam ring about its optical axis as a rotational center. The cam ring is provided on a forward portion thereof with a cut-way portion extending in its peripheral direction, a forward portion of the finder optical unit being located in the cut-away portion.

7 Claims, 5 Drawing Sheets

CAMERA WITH ZOOM LENS

BACKGROUND OF THE INVENTION

1. Field of the Invention

The present invention relates to a camera with a zoom lens, and is of the type in which a photographing optical system is disposed separately from a finder optical system.

2. Description of Related Art

A camera with its photographing optical system disposed separately from its finder optical system cannot avoid parallax. Although length of parallax depends upon distance between an optical axis of the photographing optical system and an optical axis of the finder optical system, the distance could not be shortened below a given value by the structure of the conventional camera. In particular, an electronic still camera requires a photographing element board disposed at a rearward portion of the photographing lens system to have a large size so that it is difficult to cause the optical axis of the photographing optical system to approach to that of the finder optical system.

SUMMARY OF THE INVENTION

The present invention has the object to provide a zoom lens camera of the type having a zoom-photographing optical system disposed separately from the finder optical system, which can render its parallax smaller.

The present invention has been made by focusing on the fact that a cam ring is usually disposed so as to be pivotable about the optical axis of the zoom-photographing lens in order to permit zooming of the zoom-photographing lens, and it has been completed on the basis of the finding that the optical axis of the zoom-photographing optical system can approach to that of the finder optical system if a forward portion of the finder optical unit is located in a cut-away portion of the cam ring.

The zoom lens camera according to the present invention comprises a zoom-photographing optical system and a finder optical unit separately disposed from the zoom-photographing optical system. The zoom-photographing optical system in the zoom lens camera capable of zooming by rotation of the cam ring about the optical axis thereof as a rotational center is characterized in that a cut-away portion is formed in a peripheral surface of a forward portion of the cam ring and that a forward portion of the finder optical unit is located in the cut-away portion.

The cut-away portion in the peripheral surface to be disposed on the cam ring is formed in a range of angles at which the zooming of the zoom-photographing optical system not blocked.

An optical path of the finder optical unit comprises a forward optical path in parallel to the photographing optical system and closer to the optical axis of the photographing optical system, a rearward optical path spaced from the optical axis of the photographing optical system farther than the forward optical path, and a deflected optical path connecting the forward optical path to the rearward optical path. This arrangement permits the optical axis of the zoom-photographing optical system to be away from that of the finder optical unit at a rearward portion of the camera, thereby ensuring a photographing opening for a silver salt camera and enabling a use of a large-size photographing element board for an electronic still camera.

The deflected optical path is disposed at a position forwardly of the photographing element board with photographing elements, the board being located at a position rearward of the zoom-photographing optical system.

BRIEF DESCRIPTION OF THE DRAWINGS

The present invention will be described below in detail with reference to the accompanying drawings, in which.

DETAILED DESCRIPTION OF THE PREFERRED EMBODIMENTS

Figure 1:
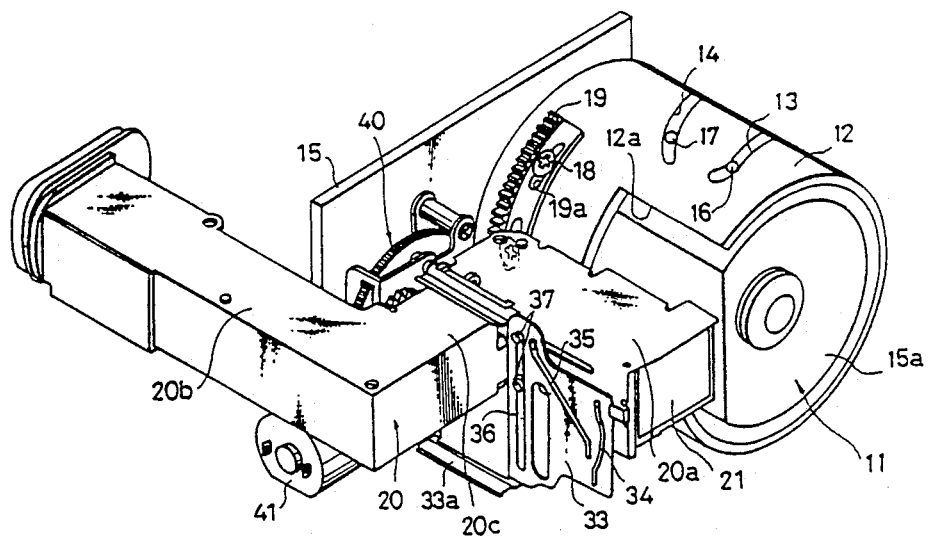
FIG. 1 is a perspective view of a camera with zoom lens according to the present invention.

A zoom-photographing lens 11 comprises a zooming cam ring 12 disposed on its outer periphery and zooming cam grooves 13 and 14 for a movable lens are formed on the cam ring 12. Guide pins 16 and 17 disposed integrally with a front lens group (not shown) and a rear lens group (not shown) are inserted in the cam grooves 13 and 14, respectively. On an outer periphery of the cam ring 12 a sector gear 19 is fixed through set screws 18. The sector gear 19 is provided with an elongated hole 19a extending in its peripherical direction so as to adjust the angular position of the cam ring 12 within a range of the effective length of the elongated hole 19a. Reference numeral 15 designates an AF shutter unit in ring form disposed in the zoom-photographing lens 11, and the AF shutter unit 15 is constructed, as is known, such that a focus adjusting lens is movable in accordance with a distance signal from a distance measuring device and shuter blades are opened or closed in accordance with the signal from the distance measuring device.

At one side portion of the zoom-photographing lens 11 is disposed a zoom finder unit 20 which permits the curving of the optical path into the form of a planar crank in order to render parallax as small as possible by approaching the zoom-photographing lens 11 as close as possible and to ensure space at a position rearward of the zoom-photographing lens 11. More specifically, the zoom finder unit 20 comprises a forward optical path 20a located at a position forward of and near the zoom-photographing lens 11, a rearward optical path 20b located away from the zoom-photographing lens 11, and a deflected optical path 20c connecting the forward optical path 20a to the rearward optical path 20b. The forward optical path 20a and the rearward optical path 20b are parallel to the optical axis of the zoom-photographing lens 11 and perpendicular to the deflected optical path 20c.

The cam ring 12 is provided with a cut-away portion 12a on a portion of its forward peripheral surface, which allows a penetration of the forward optical path 20a, and which enables the zoom-photographing lens 11 to approach the optical axis of the forward optical path 20a. The cut-away portion 12a is formed in a range of angles which do not interfere with the forward optical path 20 within a scope of angles at which the cam ring 12 rotates. The AF shutter unit 15 is provided with a concave portion or a planar portion 15a which avoids the forward optical path 20a.

Figure 2:
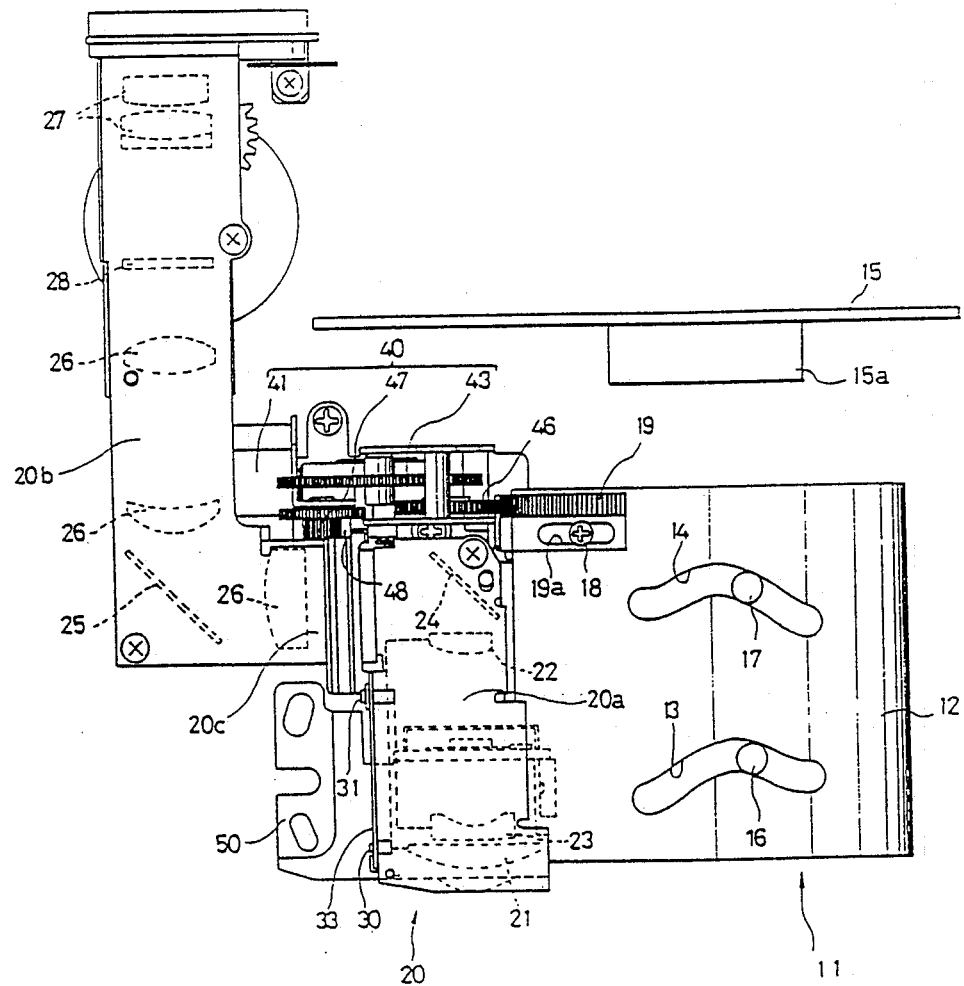
FIG. 2 is a plan view of the camera shown in FIG. 1.

As shown in FIG. 2, the forward optical path 20a is provided in its inside with movable lenses 21 and 22 arranged so as to be movable integrally with each other, and another movable lens 23. At a connection of the forward optical path 20a to the deflected optical path 20c a reflecting mirror 24 is disposed and is capable of reflecting the optical path at 90 degrees. In the reflected optical path 20c is disposed an objective optical unit 26, and a reflecting mirror 25 capable of reflecting the optical path at 90 degrees at a connection of the rearward optical path 20b to the deflected optical path 20c. The rearward optical path 20b is provided with an objective optical system 26, a field frame 28 and an eyepiece 27.

The zoom finder unit 20 having the above structure comprises a real image finder of a relay lens type, thus enabling an observation of an aerial image formed by the movable lenses 21 to 23, inclusive, as an erect image through the reflecting mirrors 24 and 25, the objective optical system 26, and the eyepiece 27.

The advantage underlying the present invention resides in that the cam ring 12 of the zoom-photographing lens 11 is provided in the peripheral surface with the cut-away portion 12a on the side of the zoom finder unit 20 the forward portion of which is located in the cut-away portion 12a. This structure permits the optical axis of the zoom-photographing lens 11 to approach to the optical axis of the zoom finder unit 20, thereby rendering a degree of parallax smaller.

As has been described hereinabove in the embodiment, deflecting the optical path of the zoom finder unit 20 and locating the deflected optical path 20c at a position forwardly of the photographing element board 50 to be disposed at a rearward portion of the zoom-photographing lens 11 enables the use of a large-size board as the photographing element board 50 for the electronic still camera (similar to a photographic opening for the silver salt camera) and make the structure of an image treating circuit simple in the drawing, reference numeral 50a denotes a photographing element fixed to the board 50.

It is at least necessary that the objective lens 21 of the zoom finder optical unit 20 be located in the cut-away portion 12a provided on the cam ring 12. For the finder optical unit of this type, the objective lens 21 is largest in diameter so that it is effective to make the parallax smaller; thus a portion of the objective lens 21 is located inside the cam ring 12 of the zoom-photographing lens 11. This arrangement alone is effective in making the parallax smaller. In this case, it is also possible to make the optical path of the zoom finder unit 20 straight.

The movable lenses 21, 22, and 23 of the zoom finder unit 20 are each moved in a given track, thereby changing the magnification of the finder. To a support member (a movable lens frame) of each of the movable lenses 21 and 22 is mounted a driving pin 30, while a driving pin 31 is mounted to a support member (a movable lens frame) (not shown) of the movable lens 23. The driving pins 30 and 31 are inserted into zoom cam grooves 34 and 35 of a finder cam plate 33 located on a side surface of the forward optical path 20a of the zoom finder unit 20, respectively. Reference symbols 32a and 32b denote for guide grooves extending straight-forward in the optical axis direction, which are formed on a casing of the forward optical path 20a and into which the driving pins 30 and 31 are respectively inserted.

Figure 3:
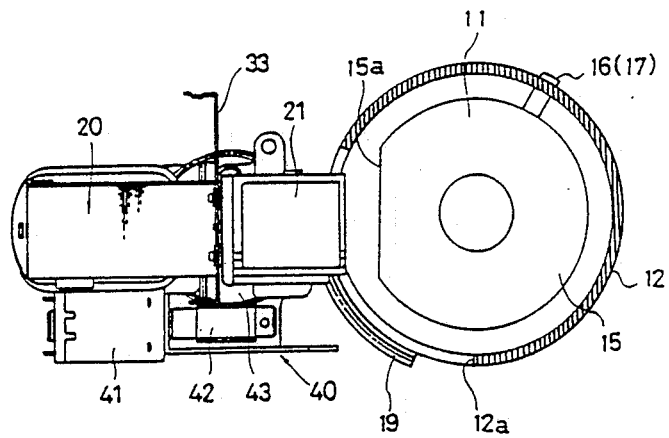
FIGS. 3 and 4 are each a front view each showing an opposite pivoting end of the cam ring of the camera according to the present invention.
Figure 4:
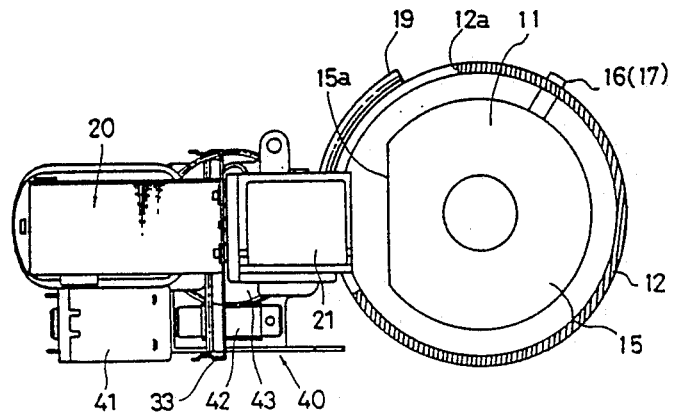
Figure 5:
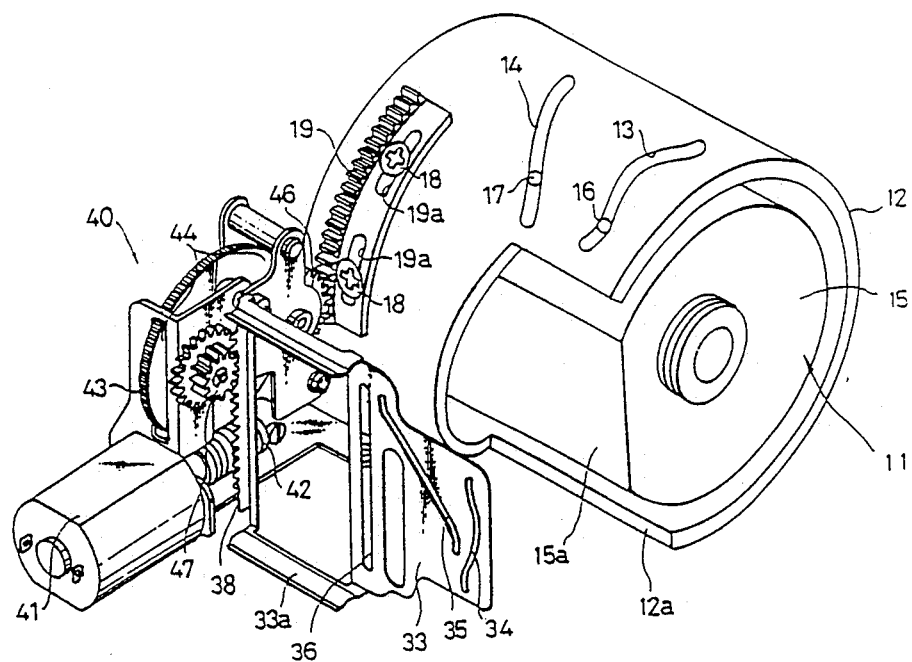
FIG. 5 is a perspective view with a zoom finder unit excluded from the camera according to the present invention.
Figure 6:
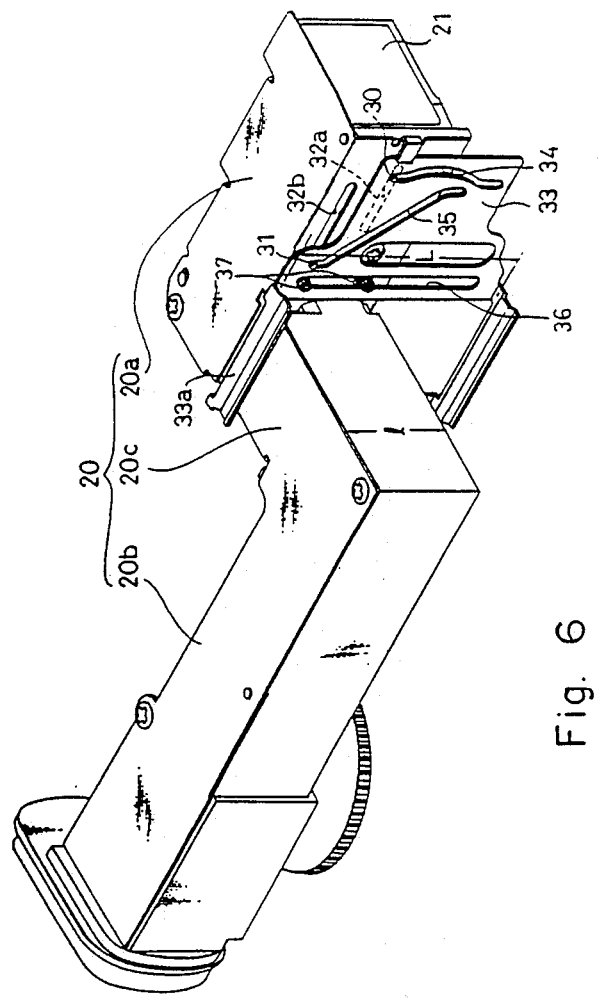
FIG. 6 is a perspective view showing the zoom finder unit of the camera according to the present invention.

The finder cam plate 33 is provided at its rearward portion with a rectangular driving unit 33a enclosing the deflected optical path 20c, and a rack 38 is formed in a longitudinal direction at a rearward portion of the rectangular driving unit 33a. The finder cam plate 33 is provided with a guide groove 36 extending in a vertical direction and the guide pin 37 mounted on the side surface of the forward optical path 20a is engaged with the guide groove 36 in order to regulate a vertical movement of the finder cam plate 33. An inner dimension L (FIG. 6) in the vertical direction of the rectangular driving portion 33a of the finder cam plate 33 is greater than a thickness l of the refracted optical path 20c, thus a vertical movement is allowed for a distance in a vertical direction by the difference between the inner dimension L and the thickness l. The rack 38 is disposed such that the finder cam plate 33 is movable vertically substantially in a symmetrical manner from the center of the thickness of the zoom finder unit 20. As shown in FIGS. 3 and 4, the sector gear 19 is disposed so as to allow its both rotary ends of the cam ring 12 to be movable in a substantially symmetrical manner in a vertical direction from the horizontal line passing through the center of the photographing lens 11. This disposition of the finder cam plate 33 and the sector gear 19 can make a thickness of the camera thinner.

To a back of the deflected optical path 20c of the zoom finder unit 20 a driving mechanism unit 40 is fixed which can transmit rotation of a reversible driving motor 41 through a worm wheel 43 and a gear train 44, which includes at least one gear (not shown) which is driven by worm wheel 43 to mesh with and drive a pair of pinions 46 and 47. The pinion 46 is in mesh with the sector gear 19 of the cam ring 12, and the pinion 47 is in mesh with the rack 38 of the finder cam plate 33.

Operation of the zoom lens camera of the lens shutter type having the structure as has been described herein above will be described hereinafter. The reversible driving motor 41 of the driving mechanism unit 40 is reversibly driven by a number of revolutions (angle) in accordance with the distance signal from the distance measuring unit 50. This reversible movement simultaneously rotates the pinions 46 and 47, and the rotation of the pinion 46 in turn causes the cam ring 12 to turn with the aid of the sector gear 19. The reversible rotation of the cam ring 12 permits a transfer of the front lens group and the rear lens group in the optical axis direction through the zooming cam grooves 13 and 14, respectively, thus changing a distance therebetween and zooming the zoom-photographing lens 11. The reversible rotation of the pinion 47 allows a vertical movement of the finder cam plate 33, thereby transferring the movable lenses 21 to 23, inclusive, in the optical axis direction by means of the zoom cam grooves 34 and 35 and zooming the zoom finder unit 20.

The zoom-photographing lens 11 and the zoom finder, unit 20 are adjusted so as to substantially relate the photographing area of the zoom-photographing lens 11 with a finder field of the zoom finder unit 20. In other words, this adjustment can be made by adjusting the relative angular position of the sector gear 19 relative to the cam ring 12 within a range of the effective lengths of the periphery elongated hole 19a.

As has been described hereinabove, the zoom lens camera of the lens shutter type according to the present invention is provided at a forward portion of its cam ring with a peripheral cut-away portion for zooming the zoom-photographing lens in such a manner that the forward portion of the zoom finder optical unit is located in the cut-away portion, thereby enabling approach of the optical axis of the zoom-photographing lens to that of the zoom finder optical unit and making the parallax smaller.

Furthermore, the present invention can readily ensure a space at a position rearward of the zoom-photographing optical system, thereby providing a large photographing opening for the silver salt camera or a large-size photographing element board on which photographing elements are mounted for the electronic still camera. In particular, for the electronic still camera, the present invention and making a potographing element board large in size.

We claim:

1. A zoom lens camera comprising a zoom-photographing optical system; and a finder optical unit disposed separately from said zoom-photographing optical system;
    wherein movement of said zoom-photographing optical system for zooming is effected by rotating a cam ring about the optical axis as a rotational center; and
    a cut-away portion formed in a peripheral surface on a forward portion of said cam ring, a forward portion of said finder optical unit being located in the cut-away portion.

2. A zoom lens camera according to claim 1, wherein said finder optical unit is a zoom finder optical unit.

3. A zoom lens camera according to claim 2, wherein an optical path of said zoom finder optical unit comprises a forward optical path parallel to the photographing optical system and near an optical axis of said photographing optical system, a rearward optical path further away from the optical axis of said photographing system than the forward optical path, and a deflected optical path connecting the forward optical path to the rearward optical path.

4. A zoom lens camera according to claim 3, wherein
    the camera is an electronic still camera; and
    the deflected optical path of said finder optical unit is disposed forward of a photographing element board with a photographing element mounted thereon, which is located at a position rearwardly said zoom photographing optical system.

5. A zoom lens camera according to claim 1, wherein said cam ring is in the form of a ring as a whole so as to be zoomed by rotation and said cam ring is provided at a portion of its forward portion with a cut-away portion.

6. A zoom lens camera according to claim 5, wherein
    said cam ring in the form of a ring as a whole is provided with at least two cam grooves and with said cut-away portion at a forward portion thereof; and
    said cam ring is further provided at its outer periphery with a gear extending in a peripheral direction.

7. A zoom lens camera as claimed in claim 6, wherein said gear is adjustly positioned in a peripheral direction relative to the cam ring.

* * * * *

UNITED STATES PATENT AND TRADEMARK OFFICE
CERTIFICATE OF CORRECTION

PATENT NO. : 4,967,219
DATED : October 30, 1990
INVENTOR(S) : T. MORISAWA et al.

It is certified that error appears in the above-indentified patent and that said Letters Patent is hereby corrected as shown below:

On the cover sheet, section [57] of the printed patent, line 8 of the abstract, change "cut-way" to ---cut-away---.
At column 6, line 17 (claim 4, line 6) of the printed patent, insert ---of--- after "rearwardly".
At column 6, line 22 (claim 5, line 4) of the printed patent, change "a portion" to ---said portion---.
At column 6, line 31 (claim 7, line 2) of the printed patent, change "adjustly" to ---adjustably---.

Signed and Sealed this

Seventeenth Day of January, 1995

Attest:

BRUCE LEHMAN

*Attesting Officer*  *Commissioner of Patents and Trademarks*